March 3, 1953  J. R. SNYDER  2,630,131
VALVED DRUM CAP AND SPIGOT ASSEMBLY
Filed March 11, 1949  2 SHEETS—SHEET 1
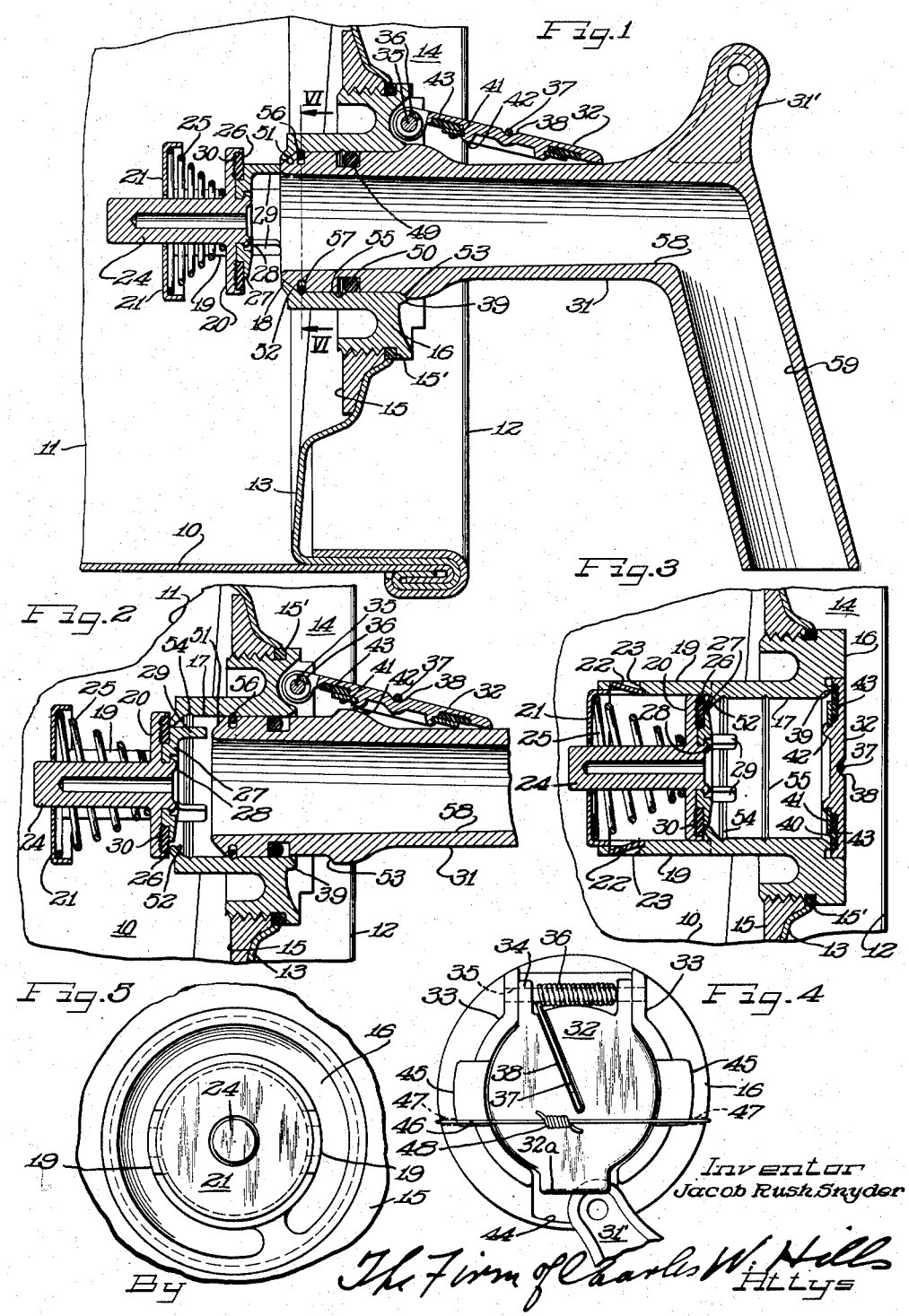
Inventor
Jacob Rush Snyder
By The Firm of Charles W. Hill
Attys

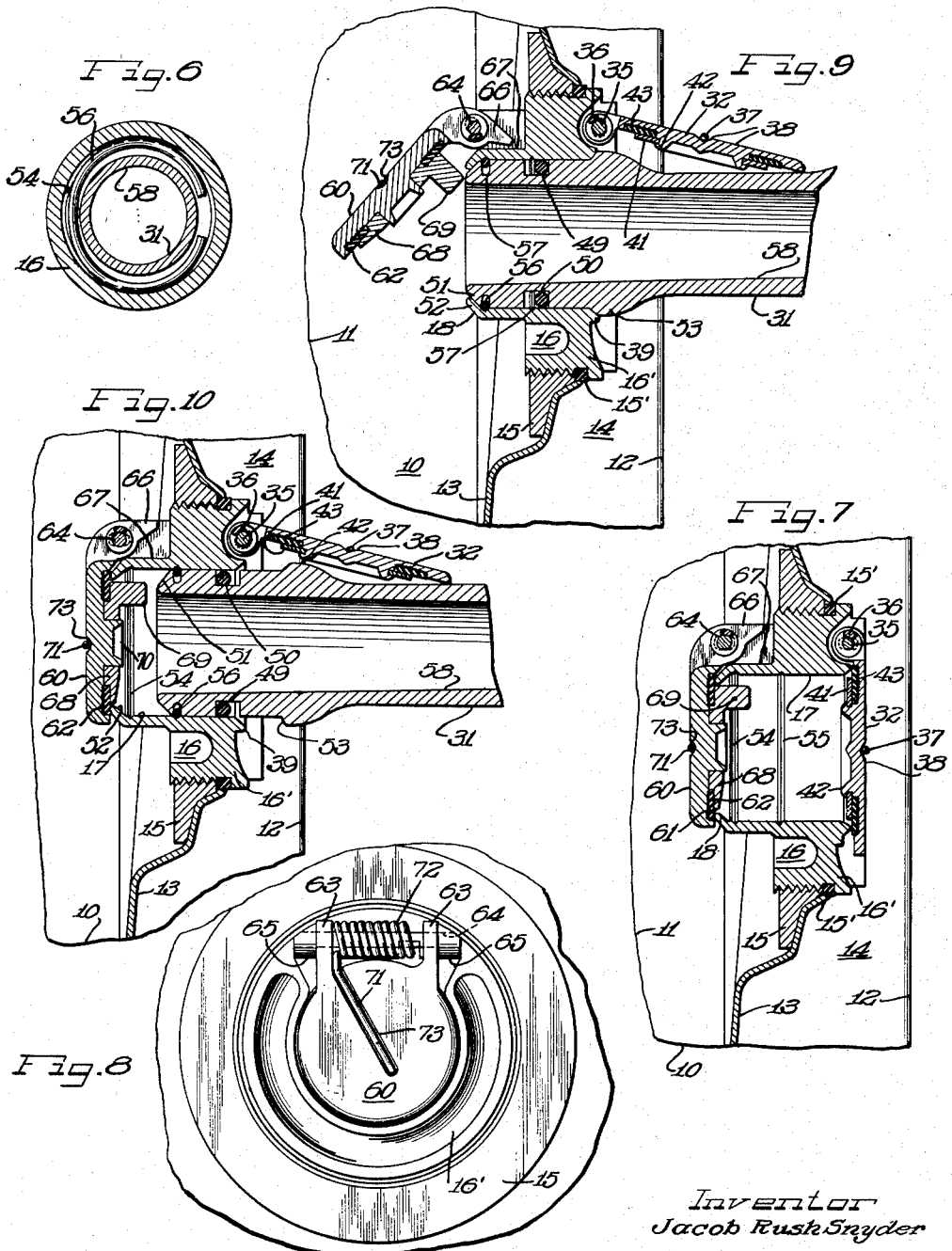

Patented Mar. 3, 1953

2,630,131

UNITED STATES PATENT OFFICE 2,630,131

VALVED DRUM CAP AND SPIGOT ASSEMBLY

Jacob Rush Snyder, Cleveland, Ohio, assignor to Thompson Products, Inc., Cleveland, Ohio, a corporation of Ohio Application March 11, 1949, Serial No. 80,948

5 Claims. (Cl. 137—322)

This invention relates to a valve equipped bung bushing assembly for receiving a seal ring carrying valve actuating detachable spigot which selectively positions the seal ring of the assembly while the spigot is releasably retained for holding the valve in open position or out of valve actuating position.

More particularly, this invention relates to a valved bung bushing assembly equipped with a spring loaded valve to control drainage from a barrel or drum and also with a spring loaded valve forming a dirt eliminator seal to effectively seal a spigot opening in the bung bushing assembly both in transport of the drum and upon withdrawal of the spigot.

According to this invention, a ring is adapted to fit a bung bushing which is equipped with a spring loaded valve to control drainage from a barrel or drum. This bushing ring has a passageway therethrough adapted to slidably receive a detachably mounted spigot. The end of the spigot actuates a valve to open position. In order to prevent leakage between the passageway and spigot and to retain the spigot in axial adjusted position in the bushing ring, the spigot carries a resilient seal ring around the ends thereof received by the bushing ring. To retain the spigot in position, the spigot is provided with a ring lock which engages spaced grooves in the bushing ring one of which locates the spigot with the valve in its closed position and the other groove locates the spigot in the open position of the valve. The inner groove is positioned to retain the spigot so that it will hold the valve in an open position, while the outer groove is positioned to prevent too rapid withdrawal of the spigot from the bushing ring after the valve is closed, thereby eliminating the splashing of fluid through the bushing ring.

It is an object of the invention to provide a cap and spigot assembly for containers such as drums, barrels and the like which permit rapid insertion and withdrawal of a disconnected drain spigot without destroying the hermetic sealing capacity of the cap.

It is a further object of the present invention to provide a spigot and seal assembly for removable insertion into a valved bung bushing in selected positions to hold the valve in open position and to eliminate splashing of the liquid from the bushing as the spigot is withdrawn.

Another object of the present invention is to provide a spigot and ring assembly for selective insertion into containers for gasoline and other volatile fluids to permit withdrawal of liquid without excessive volatilization of the liquid during the draining operation.

A still further object of the invention is to utilize a ring lock and seal construction on a drum spigot for holding the spigot in adjusted position to the bung bushing while preventing leakage between the spigot and bushing.

Another object of the invention is to provide a spring biased drum cap valve and dirt eliminator valve for a bung bushing which will automatically close thereby stopping fluid flow and keeping all elements, such as dirt, water, etc. from entering the drum.

A still further object of the invention is to provide a permanent automatic fluid drum cap, or adapter that has a low initial and maintenance cost and is functionally highly efficient.

Another object of the invention is to provide a removable spigot or a bung bushing that may be automatically held in flow position with a lock ring engaging a groove in the bung bushing and in lap or valve closed position in another groove in the drum bushing.

Other and further objects of the invention will be apparent from the following description of the annexed sheets of drawings, which illustrate several preferred embodiments of the invention.

On the drawings:

Figure 1 is a fragmentary cross-sectional view of an end head of a metal drum equipped with a cap assembly according to the present invention and illustrating the drain spigot in position for withdrawal of fluid;

Figure 2 is a view similar to Figure 1 but showing the poppet valve closed and the spigot held by a lock ring in the first groove of the bung bushing;

Figure 3 is a fragmentary cross-sectional view of the end head of a metal drum equipped with a cap assembly according to the present invention and illustrating the assembly in hermetically sealed and locked position as in transit or storage;

Figure 4 is front view in elevation of a dirt eliminator drum cap wired in place;

Figure 5 is a view in elevation of the poppet valve and bung bushing;

Figure 6 is a vertical sectional view taken along line VI—VI illustrating the ring lock construction of the spigot and bung bushing;

Figure 7 is a fragmentary cross-sectional view of the end head of a metal drum equipped with an adapter flapper valve drum cap and dirt eliminator cap of a modification of my invention;

Figure 8 is a vertical elevational view of a spring biased flapper valve mounted on the interior end of the bung bushing of the modification of Figure 7;

Figure 9 is a fragmentary sectional view illustrating the spigot and flapper valve and hinged cover in flow position in which the spigot is held by the second groove; and, Figure 10 is a vertical sectional view of the spigot and flapper valve in closed position and held by the first ring groove of the bung bushing and with the hinge cover open.

As shown on the drawings:

Referring to Figure 1, the reference character 10 designates generally a metal drum including a cylindrical side wall or shell 11 formed with a peripheral flange or skirt 12 and an end head portion 13, providing a recess 14 on the end of the drum.

The drum end portion 13 has a bung bushing 15 attached thereto. The bung bushing 15 is threaded to receive a bushing ring or adapter 16 and the drum is sealed against leakage by gasket 15' assembled between the bushing and the bushing ring. The bushing ring 16 which provides a permanent automatic fluid drum cap may be suitably formed to receive a spanner wrench and the like to tighten the ring in the bung bushing 15.

A central passage 17 extends through the ring 16 and is provided at its inner end with a valve seating face 18.

Referring to Figures 3 and 5, laterally spaced posts or guide members 19 are integrally formed with bushing ring 16 to provide a support for a poppet valve or closure valve 20. A valve guide 21 of cup shape form as illustrated in Figure 3 has lanced portions 22 to engage complementally formed holes 23 in guide members 19. The valve guide 21 is apertured slidably to receive a stem 24 of the valve 20 and has an end wall containing this aperture which forms a spring retainer for a conically shaped spring 25 surrounding the stem 24, Figure 4, and urging the valve 20 at all times toward the seat 18. The valve 20 is provided with a disk-like synthetic rubber sealing means 26 held in place by a retainer 27 being staked in position at 28. The retainer cap 27 is provided with three legs or prongs 29 which are tapered so that the closure valve is so perfectly guided back to its original seating position that the synthetic rubber seal 26 holds gasoline perfectly even when tested at −92° F. which is 12° below the most severe specifications.

It is important when making the synthetic rubber valve seat disk 26 from sheeted material to use a given thickness but, however, it frequently occurs that certain portions of the sheets will vary dimensionally. If the cross-section is too thick then such excess thickness will flow to the exposed or free seating surface which will bubbleize the seating surface and interfere with effective sealing. It is, therefore, preferred to provide a serrated surface 30 provided by annular rings which automatically provides grooves into which such excess rubber thickness can flow without detrimentally affecting the desired sealing efficiency of the rubber disk and at the same time improve the cross pressure holding qualities of the seal.

From the foregoing description, it is evident that there has been described a simple poppet valve construction which is normally biased closed with its seal against the seat 18 of the bushing ring 16. After the rubber seal 26 and the retainer 27 are assembled onto the valve 20 and the spring 19 is disposed around the stem 24, the poppet valve is readily assembled between the guides 19 of the bushing ring 16 by merely snapping the guide cap 21 with the guides 19 whereby the lanced portions 22 lock the valve in the holes 23.

As shown in Figure 1, a spigot 31 has an end slidably fitting in the passage 17 of the bushing ring to engage the prongs 29 formed on the valve and force the poppet valve off of its seat a sufficient distance to effect drainage of the drum into the spigot. The prongs 29 which are spaced apart circumferentially of the valve provide free drain ports therebetween and serve to space the valve 20 sufficiently from the end of the spigot to effect free drainage.

The bushing ring 16 is also provided with a dirt eliminator drum cap 32 to prevent all elements, such as dirt, water, etc. from entering the drum and particularly to prevent corrosion of the central passage 17 of the bushing ring which might prevent the insertion of the spigot 31. This assures any remaining fluid being kept clean of corroding fluids and substances which heretofore have been responsible for reducing the life expectancy of a drum considerably.

Referring to Figures 1, 3 and 4, the particular construction of the dirt eliminator drum cap 32 will be described. The bushing ring 16 or adapter is provided on its front face with symmetrically spaced flanges 33 complementally formed with respect to ears 34 of the cap, and the cap 32 is hinged to the flanges 33 by hinge pin 35. A torsion spring 36 formed as illustrated in Figure 4 with a laterally extending portion 37 engaging a complementally formed groove 38 spring biases the dirt eliminator cap 32 against the seat 39 formed on the bushing ring or adapter 16. The cap 32 is sealed by a gasket 40 similarly formed to the gasket 26 described above from synthetic rubber such as chloroprene rubber which can withstand attack by the fluids contained in the drum. The gasket 40 is held in place by a washer 41 by staking over the cap as at 42. The annular seat 43 for the gasket 40 is also serrated similarly with annular grooves as the seat 30 described with reference to the poppet valve, this serrating automatically providing grooves into which excess rubber thickness can flow without detrimentally affecting the desired sealing efficiency of the rubber disk 40 and at the same time improve the cross pressure holding qualities of the seal.

The hinge pin 35 is held in position by staking the hinge support 33.

To provide a flat surface for the cap 32, the adapter 16 is recessed, for example, as illustrated at Figure 4 to receive the cap and also to provide relief for the seat 39.

The cap 32 is also provided with a lip 32a, complementally formed to a recess 44 for the insertion of the operator's finger in raising the cap for the insertion of the spigot or, for example, if the cap is frozen or stuck it provides a recess for the insertion of the tapered extension 31' of the spigot, Figure 4, which may be inserted in the recess and underneath the lip 32a to pry the cap open for the insertion of the spigot.

The bushing ring 16 is also provided with recesses 45 for assembling the assembled poppet valve drum cap to the drum head with a spanner wrench as is now done with the conventional old style bung cap.

During transit or storage, the hinged valve 32 is firmly held in its closed position by wiring 46 which passes through holes 47 extending from the recesses 45 to the edge of the adapter, as illustrated in Figure 4, and firmly twisting the ends of the wire together as at 48.

Referring to Figures 1, 2, and 6, the novel spigot construction 31 and the complementally formed central passage 17 of the bushing ring 16 will be described. This construction is particularly adapted for detachably mounting the spigot in the adapter 16 after the dirt eliminator cap 32 has been opened to release the poppet valve drum cap 20 in order that the fluid within the container or drum 10 may be readily discharged from the spigot.

Figure 1 shows the assembly of the dirt eliminator cap opened for the insertion of the spigot 31 and with the spigot in flow position, whereas Figure 2 illustrates the poppet valve closed with the spigot held in position in lap or closed position. The spigot assembly includes a die cast body 31 and a rubber-like O ring seal 49 closely fitted into a wider groove 50 of the spigot body. The spigot has a converging, tapered end portion 51 engaging a complementally formed portion 52 of the adapter 16 at the entrance of the passage 17. The passage 17 tapers or converges inwardly to the valve seat 18 to receive the tapered end 51 so that the discharge passage to the spigot can have a diameter almost as large as the seat 18, thereby accommodating full discharge capacity flow from the valve. This arrangement permits the use of a smaller diameter valve seat without loss of flow capacity. Such a smaller valve seat acts on a smaller circle of the valve head gasket 26 thereby reducing the effect of resistance toward opening the valve which is exerted by the fluid in the drum. It will be noted that the seat 18 only engages a narrow band area of the gasket which lies immediately adjacent the discharge opening.

A shoulder or flange 53 is provided on the spigot to be bottomed on the complementally formed seat 39 of the dirt eliminator cap 32 for limiting the travel of the spigot into the passage 17.

Referring to Figures 1, 2, and 6, the passage 17 is provided with an inner groove 54 and an outer positioned groove 55 on the peripheral surface of the passage 17. These grooves are adapted to be engaged upon the insertion of the spigot 31 by a lock ring 56 seated in a complementally formed recess or annular formed groove 57 of the spigot. The lock ring 56 is preferably made oblong, as illustrated in Figure 6, so that the two ends will contact the spigot grooved diameter 57 and thereby not scratch the inside diameter of the spigot chamber 17 leaving the two smooth sides of the ring as locking surfaces in the grooves 54 and 55.

The body of the spigot assembly 31 has an angled passage 58 extending outwardly from the inner end of the spigot 31 to a downwardly extending discharge spout portion 59, as illustrated in Figure 1. A convenient operating handle 31' is provided above the spout 59.

Referring to Figure 2, the spigot assembly is shown partially inserted in the passage 17. To insert the spigot 31 as shown in Figure 2, the dirt eliminator valve or cap 32 is opened and the spigot is inserted in the spigot chamber 17 of the cap or adapter 16. Before the lock ring 56 engages the groove 55, the O ring 49 will be in contact with the periphery of the spigot chamber 17 and be in position to prevent fluid leakage when the inner ends of the spigot forces the valve 20 from its seat by engaging the legs 29 of the valve cap member 27. In the position shown in Figure 2, the valve 20 is still closed and the container sealed by virtue of the contact between the gasket 26 and the valve seat 18.

Figure 1 shows the condition when the spigot 31 is completely inserted into the passage 17, and the valve assembly 20 is open to permit drainage.

In this position, the O ring 49 still forms a seal between the spigot and the passage 17 and the spigot 31 is in position so that the lock ring 56 engages the inner groove 54. The tapered end portion 51 of the spigot is fitted into the complementally formed valve seat portion 52. The end of the spigot 31 engages the prongs 29 compressing the spring 25 so that the gasket 26 is unseated from the valve seat 18. Liquid may then flow from the interior of the drum through the passages formed by the prongs 29 between the valve 20 and the end of the spigot 31.

When sufficient drainage has been effected, the spigot 31 may be removed from the assembly. An initial outward thrust will cause the locking ring 56 to become disengaged from the locking groove 54 whereupon the spigot may be moved to the position, for example, as shown in Figure 2, with the locking ring 56 engaging the groove 55. In this position, the poppet valve 20 closes sealing the interior of the drum. A seal is still provided by the O ring 49. A second outward thrust serves to disengage the locking ring 56 from the groove 55 and permits complete withdrawal of the spigot 31 from the assembly. This dual action, in slowing down the withdrawal of the spigot, permits drainage of the contents from the angled passage 58 and prevents leakage between the spigot and the bushing ring 16, thereby protecting the operator against splashing such as would occur if the spigot 31 were removed from the sealed chamber in one quick outward thrust.

Obviously, when the spigot 31 is withdrawn from the bushing ring 16, the valve 20 has already been closed in the position as shown in Figure 2, and, upon complete removal of the spigot 31 from the bushing ring 16, the dirt eliminator cap 32 will likewise automatically close thereby stopping fluid flow and keeping all elements, such as dirt, water, etc. from entering the drum. This not only assures any remaining fluid being kept clean, but so minimizes drum corrosion that the life expectancy of the drum will be more than doubled.

Inasmuch as the drum so equipped as described above does not have to be placed on its end for the purpose of attaching a spigot, which has been necessary heretofore, the present invention not only minimizes man power injuries, but permits stacking drums on their sides in large piles with mechanical lifts so that the drums are ready for instant fluid withdrawal as and when desired.

Figures 7, 8, 9 and 10 show another embodiment of the present invention, utilizing a flapper valve construction 60 instead of the poppet valve 20 of Figure 1. As the construction of the spigot 31, the dirt eliminator cap 32 and the locking ring construction and the O seal construction of the spigot and bushing ring 16' of this embodiment are similar to that described with reference to Figures 1 to 6, inclusive, further description of these parts is unnecessary and therefore like reference characters will indicate the like or similar parts of the two embodiments of this invention. The flapper valve 60 is similarly constructed as the dirt eliminator cap 32 in that the valve cap 60 is provided with a serrated seat 61 provided with annular rings for seating a chloroprene rubber gasket 62 which can withstand attack by the fluid contained in the drum as the gaskets 26 and 40 previously described. The flapper valve 60 cooperates with the seat 18 of the bushing ring 16' to close the drain passage 17. The valve 62 has a pair of ears or lugs 63 receiving a pin 64 therethrough mounted in lugs 65 of the bushing ring 16' to swingably mount the valve on the bushing ring 16'. A stop 66 engaging a recess 67 limits the vertical movement of the valve 60. A valve cap retainer 68 of the flapper valve 60 comprises an integrally extending prong 69 which is adapted to engage the inner end of the spigot 31, as illustrated in Figure 9, and is adapted also to affix the gasket 62 comparable to the gasket 26 in position by peening or staking as at 70.

The inner face of the valve 62 is engaged by a laterally extending spring finger 71 of a torsion spring 72 disposed about the pin 64 and the opposite end thereof bottomed in the recess 67. The drum cap 60 is complementally formed at 73 to receive the spring finger 71, Figure 8. The washer or gasket 62 made of resilient material such as a chloroprene rubber is disposed between the valve cap retainer 68 and the drum cap 60 to present a space for engaging the valve seat 18 to seal the passageway 58 when the valve 60 is in its closed position, for example, as in Figure 10.

Figure 7 illustrates this embodiment of the invention of the pivoted flapper valve and dirt eliminator cap of the drum assembled according to the present invention and illustrating the assembly in hermetically sealed and locked condition as in transit or storage, and the dirt eliminator cap 32 may be wired in position for transit and storage, as illustrated in Figure 4.

The operation of the flapper valve drum cap of the embodiment illustrated in Figures 7, 8, 9 and 10 is substantially similar to that described with reference to the operation of the embodiment illustrated in Figure 1. Figure 10 illustrates the condition wherein the spigot 31 containing the lock ring construction 56 and carrying the resilient O sealing ring 49 is inserted into the ring assembly 60 after raising the pivoted dirt eliminating cap 32 in the position shown. In this position, the valve 60 is still closed and in sealing engagement with the sealing ring 62 engaging the valve seat 18. In the position shown in Figure 7, the lock ring 56 engages the outer positioned grooved 55.

When the spigot 31 is completely thrust into the ring assembly 16', as shown in Figure 9, the shoulder 53 engages the complementally formed seat 39 and the inner end of the spigot 51 engages the complementally formed portion 52 of the bushing ring 16', and the inner face of the spigot engages the outwardly extending prong 69 to unseat the valve 60 from the seat 18. In the completely opened position, as shown in Figure 9, the locking ring 56 engages the inner groove 54. Although the force exerted by the spring 72 and the flow of fluid through the opening into the spigot from the drum tends to force the spigot outwardly, the locking ring 56 securely retains the spigot in its drainage position. The O ring 49 effectively seals the spigot within the passage 17 to prevent leakage of fluid.

When sufficient drainage of the drum occurs, the spigot 31 is pulled out of the assembly in two stages. In the first stage represented by Figure 10, the pivoted flapper valve 60 is closed as the spigot moves so that the lock ring engages the corresponding groove 55, and the spigot is still sealed by the O seal 49. A second outward pull on the spigot 31 will unseat the lock ring 56 from the locking groove 55 and permit complete withdrawal of the spigot from the ring assembly without splashing the contents of the spigot drain portion. As the spigot 31 is removed from the bung assembly, the dirt eliminator cap 32 is spring biased into its closed position, Figure 7.

From the above description, it will be understood that this invention provides a self-closing cap assembly for drums, barrels, and other containers and is adapted to be readily mounted in the bung bushing of a drum or barrel and can be locked in position for storage and shipping, or can receive a demountable drain spigot carrying a lock ring and seal construction for selective positioning of the spigot.

It is also evident that there has been disclosed a self-closing drum cap assembly and dirt eliminator cap assembly for drums and the like in which the fluid flow characteristics of this unit are greatly superior to the spigots now in use that have to be manually held in flow position. Furthermore, this new unit meets all vacuum, pressure and temperature tests particularly those corresponding to severe arctic conditions for which this assembly is used and that the synthetic rubber-like seal holds gasoline perfectly when tested, for example, at −92° F. which is 12° below the most severe specifications.

There has also herein been provided a permanent automatic fluid drum cap, or adapter, that has a low initial and maintenance cost and is functionally highly efficient for the most severe weather conditions.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In a drum cap and spigot assembly, the improvement of a bushing ring to be mounted in a drum opening and having a flow passage therethrough, a poppet valve mounted at one end of said ring and having a spring biased valve element seatable on the end of said ring to control the flow of fluid through the flow passage, a second valve at the other end of the ring comprising a spring biased gate valve normally urged into seated position on the other end of the ring to preclude the entry of dirt into the flow passage, a spigot insertable in said flow passage upon opening said gate valve and having a projecting portion to retain said gate valve open when said spigot is positioned in said flow passage, the end of said spigot being engageable with said poppet valve to open same upon insertion of said spigot into said flow passage and complementally formed interlocking mating means between said spigot and said ring to lock said spigot in adjusted axial positions, said mating means comprising interlocking ring and groove means including a ring of flexible material to seal the spigot in the flow passage.

2. In a drum cap and spigot assembly, a bushing ring having a flow passage therethrough and a plurality of radially spaced guide members projecting from one end thereof, a plurality of apertures, there being one aperture in the end of each of said guide members, a cup-shaped element having lanced portions in the side walls thereof engageable in each of said guide member apertures to place said cup-shaped element and said guide member in firm assembly with one another, said cup-shaped element having an opening through the end wall thereof, a valve having a stem slidably supported in the end wall opening of said cup-shaped element and a head portion on said valve slidably engageable with said guide members, a spring around said stem operative between said cup-shaped element and said valve head portion to normally spring bias said valve toward the bushing ring and a radially inwardly extending annular lip on the bushing ring forming a valve seat for said valve.

3. In a drum cap and spigot assembly, a bushing ring having a flow passage therethrough and a plurality of radially spaced guide members projecting from one end thereof, an aperture in the end portion of each of said guide members, a cup-shaped element having lanced portions in the side walls thereof engageable in said guide member apertures, said cup-shaped element having an opening through the end wall thereof, a valve having a stem slidably supported in the end wall opening of said cup-shaped element, a head portion on said valve slidably engageable with said guide member, a spring around said stem operative between said cup-shaped element and said valve head portion to normally spring bias said valve towards the bushing ring, a radially inwardly extending annular lip on the bushing ring forming a valve seat for said valve, and a spigot engaging member having a plurality of axially projecting prongs and being mounted in firm assembly on the valve head portion of said valve, whereby a spigot inserted into said bushing will engage said prongs and open said valve against the bias of said spring.

4. In a drum cap and spigot assembly, a bushing ring having a flow passage therethrough and a plurality of radially spaced guide members projecting from one end thereof, an aperture in the end of each of said guide members, a cup-shaped element having lanced portions in the side walls thereof engageable in said apertures to place said element in firm assembly with said guide members, said cup-shaped element having an opening through the end wall thereof, a valve having a stem slidably supported in the end wall opening of said cup-shaped element, a head portion on said valve slidably engageable with said guide members, a spring around said stem operative between said cup-shaped element and said valve head portion to normally spring bias said valve towards the bushing ring, and a radially inwardly extending annular lip on the bushing ring forming a valve seat for said valve, said valve head portion having a serrated seating surface and a gasket made of elastic material affixed thereto to engage said annular lip, whereby seating of said valve against said annular lip will elastically displace said elastic gasket into said serrations to improve the pressure holding seal of the valve.

5. In a drum cap and spigot assembly, a bushing ring having a flow passage therethrough and a plurality of radially spaced guide members projecting from one end thereof, a cup-shaped element retained on the end of said guide members, said cup-shaped element having an opening through the end wall thereof, a valve having a stem slidably supported in the end wall opening of said cup-shaped element and also having a head portion slidably engageable with said guide members, a spring around said stem operative between said cup-shaped element and said valve head portion to normally spring bias said valve towards the bushing ring, a radially inwardly extending annular lip on the bushing ring forming a valve seat for said valve head portion having a serrated surface, a gasket made of elastic material abutting the serrated seating surface of said valve head portion and adapted to engage said annular lip, whereby seating of said valve against said lip will elastically displace said gasket into said serrations to improve the pressure holding seal of the valve and a spigot engaging member having a plurality of axially projecting prongs, said spigot engaging member being mounted in firm assembly on the valve head portion and operable to clamp said gasket into abutting relationship with the valve head portion, said prongs on said spigot engaging member being engageable with a spigot inserted into said bushing ring to open said valve against the bias of said spring.

JACOB RUSH SNYDER.

REFERENCES CITED

The following references are of record in the file of this patent:

UNITED STATES PATENTS

| Number | Name | Date |
|---|---|---|
| 222,029 | Flynn | Nov. 25, 1879 |
| 325,072 | Geyer | Aug. 25, 1885 |
| 807,981 | Whitaker | Dec. 19, 1905 |
| 889,952 | McGinley et al. | June 9, 1908 |
| 1,522,369 | Jaden | Jan. 6, 1925 |
| 1,873,304 | DeMooy | Aug. 23, 1932 |
| 2,096,288 | Nelson | Oct. 19, 1937 |
| 2,283,970 | Buttner | May 26, 1942 |
| 2,301,654 | Yauch | Nov. 10, 1942 |
| 2,310,599 | Roach | Feb. 9, 1943 |
| 2,356,326 | Lebus | Aug. 22, 1944 |
| 2,382,291 | Carlberg | Aug. 14, 1945 |